Dec. 12, 1933.   A. E. MASKREY   1,938,633
MANUFACTURE OF METAL TUBES
Filed July 2, 1932
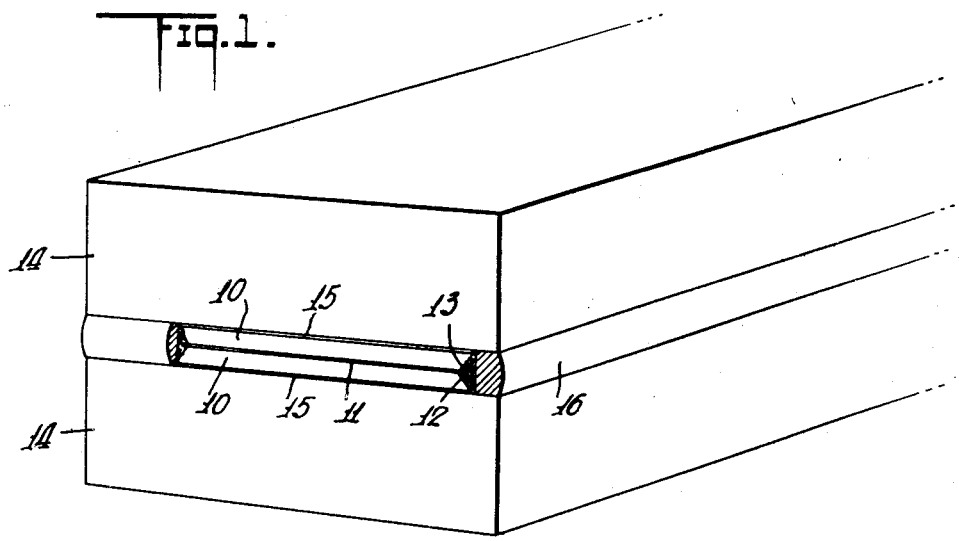
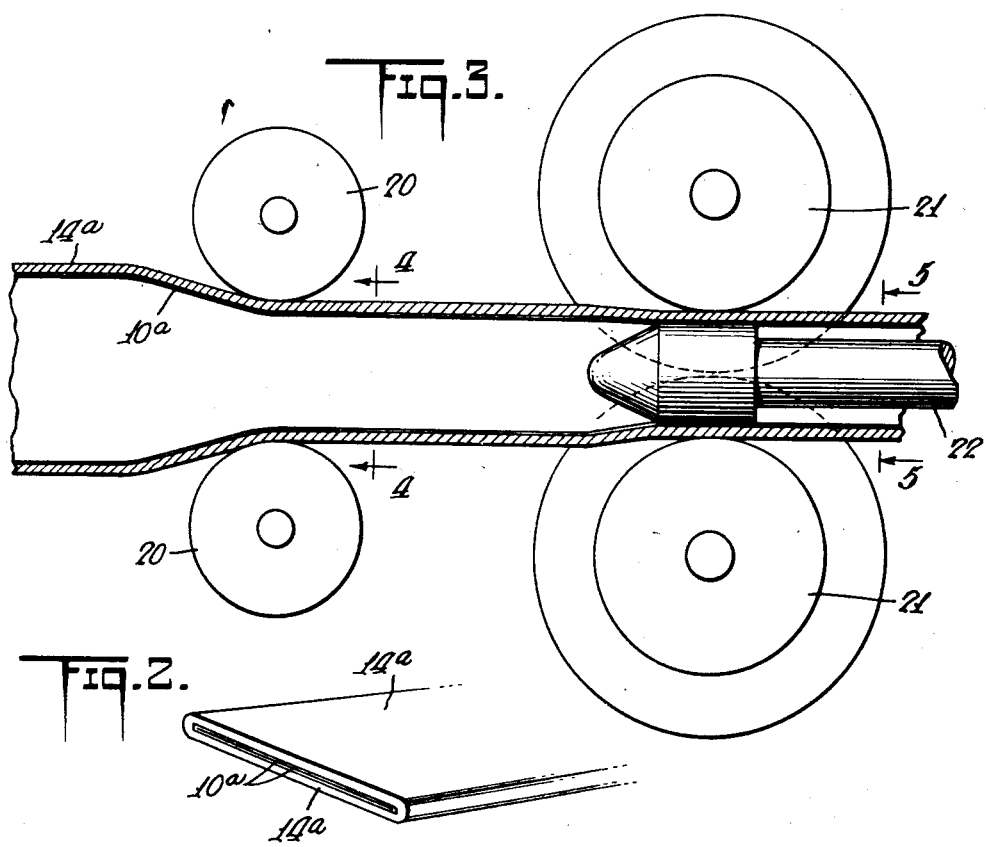
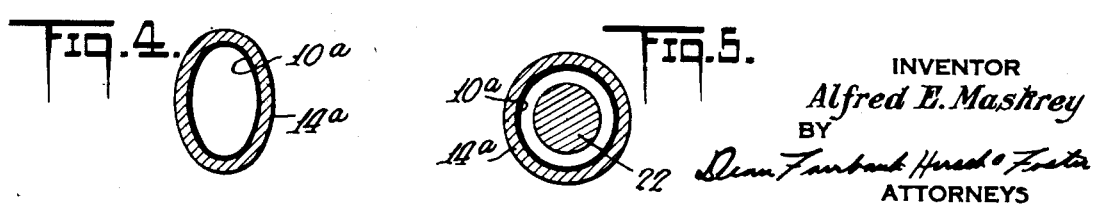
INVENTOR
Alfred E. Maskrey
BY
ATTORNEYS Patented Dec. 12, 1933

1,938,633

UNITED STATES PATENT OFFICE 1,938,633

MANUFACTURE OF METAL TUBES

Alfred E. Maskrey, Irvington, N. J., assignor to The Plykrome Corporation, New York, N. Y., a corporation of Delaware Application July 2, 1932. Serial No. 620,608

6 Claims. (Cl. 29—162)

In certain apparatus, tubes are employed for conveying acids, alkalies and other corrosive agencies, but so far as I know no cheap, effective and practical method has heretofore been available for providing such tubes with corrosion resistant linings such as chrome steel, chrome iron, chrome nickel steel, chrome nickel, molybdenum steel and the like, so as to form a composite pipe having a base of steel or iron which furnishes the required strength and thickness, and which has an alloy lining which furnishes the required corrosion resistant characteristics.

The main object of the present invention is to provide a simple and effective method of forming a metal tube with a lining of a non-corrosive material such as stainless steel.

As one important feature of the present invention, the tube is formed by first welding together the edges of a plurality of metal sheets or plates to form a slab, and then separating the portions of the slab intermediate of the edges to form a tube having the seams along diametrically opposite sides.

Another object of the invention is to form a composite tube having a lining of corrosion resistant alloy in the interior thereof, and formed in such a way as to have substantially the properties of a seamless tube.

In carrying out my invention, two slabs of mild steel or similar material are superposed with corrosion resistant plates therebetween, the plates being separated by a layer of suitable material to prevent these plates from adhering during heating and rolling operation. The corrosion resistant plates are preferably smaller than the slabs so that the edges of these plates are spaced inwardly from the edges of the slabs. These plates are welded together along their edges with an alloy of substantially the same composition as the plates, and the two slabs are welded together along their edges to hold the slabs together and to enclose the alloy plates. The pile so formed is then subjected to a heating and rolling operation in which the width of the pile is maintained substantially constant while the pile is reduced in thickness and elongated. The result of this operation is a long, thin bar having a core consisting of a continuous strip of two corrosion resistant plates welded together along their edges. The bar is then subjected to a shaping operation which includes the forcing of the billet over a shaping mandrel which opens it up to tubular form.

By means of the present invention, the weld along the edges of the slabs is subjected to heating and rolling to such an extent that the original amount of the metal weld becomes small in comparison to the length of the tube that is formed from one pile or assembly. Furthermore, the operation of rolling and heating refines the structure of the weld, and serves to more intimately amalgamate the weld into the material of the slab, so that the cross-section of the tube in the vicinity of the weld will be substantially equal to the cross-section of any other portion of the tube in strength, density and ductability.

In the accompanying drawing

Fig. 1 is a perspective view, partly in section, of a stack or pile formed preliminary to the heating and rolling operation.

Fig. 2 is a perspective view showing the pile of Fig. 1 after being subjected to a heating and rolling operation, and with one end thereof sheared off.

Fig. 3 shows a longitudinal section of the billet of Fig. 2 in the process of being opened up to tubular form, and Figs. 4 and 5 are sections taken on lines 4—4 and 5—5 respectively, of Fig. 3.

In carrying out my invention, a pair of corrosion resistant plates 10 are superposed with a suitable material 11 applied therebetween to prevent these plates from adhering during heating and rolling operation. For that purpose I employ a suitable lubricant such for instance as a mixture including aluminum powder and fire clay mixed approximately in the ratio of one to two by weight to form a thin paste.

The two corrosion resistant plates are welded along the side edges thereof by an alloy material of substantially the same composition to form a weld 13. The edges of the plates 10 may be bevelled and the plates so positioned as to form a V groove 12 therebetween. In welding the two plates together, I may employ an electric arc or a torch and welding rod.

The two corrosion resistant plates are disposed between a pair of slabs 14 preferably of mild steel, and are separated therefrom by thin intermediate bond sheets 15 preferably of comparatively pure iron, which will permit welding of the corrosion resistant plates and the mild steel slabs to the bond sheet and prevent the formation of chromium carbide from the carbon of the steel and the chromium of the alloy.

The slabs 14 are secured together by welding their edges along the sides and ends thereof to form a weld 16 entirely sealing the corrosion resistant plates 10. This weld is formed by any suitable means, as for instance by filling the space outside of the weld 13 and between the edges of the slabs with welding metal applied with a torch.

As the diameter of the tube to be formed is small compared with its length, the width of the pile shown in Fig. 1 may be very small compared with the length thereof. For instance, to form an eight-inch tube, the widths of the slabs 14 may be about twelve inches, but the length may be several feet.

After the pile has been formed as shown in Fig. 1, it is placed in a furnace and heated to a temperature of approximately 2300° F. It is then subjected to a rolling action to weld the entire outer surface areas of the alloy plates 10 to the inner surfaces of the slabs 14. The rolling is so controlled that the reduction in thickness results in no material widening, but a very substantial lengthening. The rolling is continued until the desired reduction in thickness is secured, the composite bar formed being shown in Fig. 2. The billet will cool during rolling operation, so that at the end of this operation, the temperature of the billet may be in the neighborhood of 1400° F. The initial rolling temperature may be as low as 2000° F. if the pressure is sufficient.

The length of bar formed from a stack assembly as shown in Fig. 1 is comparatively long, so that the welds 13 and 16 are distributed throughout the full length at the end of the rolling operation, and during the heating and rolling operation become so amalgamated in the metal of the slabs 14 and plates 10 as to form a substantially homogeneous unit therewith. For instance, a pile twelve inches wide and consisting of two four-inch slabs 14 and two one-half inch alloy plates may be rolled into a section about fifty feet long and about one inch thick as shown in Fig. 2, with outer walls 14a and inner walls 10a. The bond sheet which originally was only of about 16 to 24 gauge has been so reduced in thickness as to be no longer apparent to the naked eye.

After the stack of Fig. 1 has been heated and rolled into the bar form shown in Fig. 2, the ends of the bar are sheared off to expose the alloy plates 10 only at the ends. This bar is then reheated, or if the residual temperature is sufficiently high it is directly forced between a pair of preliminary forming rolls 20 spaced apart to a distance less than the width of the bar and directly engaging the edges so that a separating force is applied to the side walls of the bar. As the bar is forced between these forming rolls 20, as shown in Fig. 3, it will open in the center to separate the two alloy plates and change the bar from a flat shape, as shown in Fig. 2, to a substantially oval shape, as shown in Fig. 4. While still hot, the oval shaped bar is then passed between one or more pairs of finishing rolls 21 and over a shaping mandrel 22 placed therebetween, so as to give the member its final tubular shape shown in Fig. 5. There may be any desired number of the sets of rollers to give the tube the desired cylindrical shape, final diameter and smoothness.

The tube formed in accordance with the process of the present invention has substantially the properties of a seamless tube, in as much as the welds along the edges of the slabs and alloy plates are so distributed during heating and rolling operation that the final weld in the tube formed is comparatively small with respect to the cross-section of the tube, and the weld, during the heating and rolling thereof, is so refined in structure as to form a homogeneous part of the main portion of the tube wall, so that the tube at the welds is substantially equal in strength, density and ductability to that of any other portion of the tube wall.

Although the process has been shown as applied to the formation of a composite tube having a corrosion resistant lining, the invention may be also applied to the formation of a simple tube. For that purpose, the two slabs forming the pile are juxtaposed, separated by a suitable lubricant, welded along the side edges thereof, and then subjected to the rolling and shaping operation already described with reference to the formation of a composite tube.

Having thus described my invention, what I claim as new and desire to secure by Letters Patent is:—

1. The process of making a tube having a corrosion resistant lining, which includes forming a stack including a pair of corrosion resistant metal plates disposed between a pair of iron or steel slabs, welding the plates and slabs along the side edges, heating the stack and rolling said stack to the desired thickness, and separating the central portions of the plates to form the tube.

2. The process of making a metal tube having a corrosion resistant lining, which includes forming a pile including a pair of corrosion resistant metal plates with their edges welded together and their intermediate portions spaced by a layer of material to prevent welding between the plate surfaces, said plates being disposed between a pair of slabs having their side edges welded together, subjecting the pile to heat and pressure to reduce the thickness thereof and to weld the plates to the adjacent slabs while maintaining the width of the pile substantially constant, and then applying pressure to the edges to space apart the intermediate portions of said plates.

3. The process of making metal composite tubes, each having a corrosion resistant lining, which includes forming a pile in which a pair of corrosion resistant metal plates, welded together along the side edges thereof and separated by a layer of material to prevent welding between said plates when hot, are sandwiched between two metal slabs, welded along their edges to hold them in predetermined relative positions and to seal said corrosion resistant plates, subjecting the pile to heat and pressure to reduce the thickness thereof and to weld the plates to the adjacent slabs while maintaining the width of the pile substantially constant, and forcing the reduced pile over a mandrel entering between said plates.

4. The process of making a metal tube having a corrosion resistant lining, which includes forming a pile including a pair of corrosion resistant metal plates sandwiched between two metal slabs, the edges of the plates and the edges of the slabs being welded together along their edges, heating the pile, rolling said pile down to the desired thickness without substantially changing its width, cutting off the ends of the reduced pile, and forcing the pile endwise over a mandrel.

5. The process of making metal composite tubes having corrosion resistant linings, which includes forming a pile in which a pair of corrosion resistant metal plates are sandwiched between two metal slabs, said plates and slabs having their side edges welded together, subjecting the pile to heat and pressure to reduce the thickness thereof, cutting off the end edges of the reduced pile to expose the corrosion resistant plates, applying pressure to the side edges to open up the middle portion, and forcing a mandrel between the plates.

6. The process of forming a tube, having a corrosion resistant lining, which includes welding together the side edges of a pair of superposed flat plates of corrosion resistant material, and by the use of a corrosion resistant welding alloy, assembling a stack including said pair of corrosion resistant plates, a pair of mild steel slabs on the outsides of said plates, and a pair of metal bond sheets substantially free of carbon and disposed upon opposite sides of said corrosion resistant plates, welding together the edges of said slabs, rolling the stack down to very greatly reduce its thickness, but without materially increasing its width, applying pressure to the corrosion resistant plates, and forcing a mandrel lengthwise between said plates to form the tube substantially cylindrical in cross-section.

ALFRED E. MASKREY.